United States Patent
Hsueh et al.

(10) Patent No.: US 12,526,548 B2
(45) Date of Patent: Jan. 13, 2026

(54) ELECTRONIC DEVICE

(71) Applicant: Quanta Computer Inc., Taoyuan (TW)

(72) Inventors: Cheng-Chih Hsueh, Taoyuan (TW);
Ming Hong Ni, Taoyuan (TW);
Chih-Wei Yang, Taoyuan (TW);
Chin-Yu Liu, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 37 days.

(21) Appl. No.: 18/789,893

(22) Filed: Jul. 31, 2024

(65) Prior Publication Data

US 2025/0294267 A1 Sep. 18, 2025

(30) Foreign Application Priority Data

Mar. 18, 2024 (TW) .................. 113109937

(51) Int. Cl.
*H04N 25/75* (2023.01)
*H04N 25/71* (2023.01)

(52) U.S. Cl.
CPC ........... *H04N 25/75* (2023.01); *H04N 25/745* (2023.01)

(58) Field of Classification Search
CPC ...... H04N 25/75; H04N 25/745; H04N 23/90; H04N 5/12; H04N 5/66
See application file for complete search history.

(56) References Cited

U.S. PATENT DOCUMENTS

| | | | | |
|---|---|---|---|---|
| 8,479,248 | B2* | 7/2013 | Horan | H04L 25/02 725/127 |
| 9,019,259 | B2* | 4/2015 | Ozawa | H04L 7/0008 375/358 |
| 9,576,550 | B2* | 2/2017 | Jeon | G09G 5/006 |
| 2008/0288975 | A1 | 11/2008 | Chen | |
| 2016/0142199 | A1* | 5/2016 | Lee | H04L 7/0016 375/371 |
| 2021/0149631 | A1* | 5/2021 | Schnizler | H04L 25/14 |
| 2023/0223953 | A1* | 7/2023 | Unuma | H03M 7/6011 341/50 |

FOREIGN PATENT DOCUMENTS

TW 200844888 A 11/2008

OTHER PUBLICATIONS

Chinese language office action dated Oct. 18, 2024, issued in application No. TW 113109937.

* cited by examiner

*Primary Examiner* — Nhan T Tran
(74) *Attorney, Agent, or Firm* — McClure, Qualey & Rodack, LLP

(57) ABSTRACT

An electronic device includes an image capturing module, a deserializer, and a processor. The image capturing module generates a first image signal in a first format. The deserializer performs a de-serializing operation on the first image signal to convert the first image signal into a second image signal in a second format. The second image signal includes a clock signal and a data signal. The processor processes the second image signal to generate image data. During the transmission of the second image signal, the processor periodically transmits a trigger signal to the deserializer in a correction period. Whenever the deserializer receives the trigger signal, the deserializer inserts an initial deskew sequence into the data signal, and the processor corrects the phase of the data signal based on the initial deskew sequence and the clock signal.

10 Claims, 4 Drawing Sheets

ELECTRONIC DEVICE

CROSS REFERENCE TO RELATED APPLICATIONS

This application claims priority of Taiwan Patent Application No. 113109937, filed on Mar. 18, 2024, the entirety of which is incorporated by reference herein.

BACKGROUND OF THE INVENTION

Field of the Invention

The present invention relates to an electronic device, and, in particular, to an electronic device for signal phase correction.

Description of the Related Art

Common image signal transmission components include clock signals and data signals. During high-speed transmission between two devices, a phase difference may occur between the clock signals and the data signals due to differences in transmission line length or environmental temperature. When the phase difference is severe, it will cause data transmission errors, thereby causing disconnection between the two devices. Therefore, in general, phase correction is performed to compensate for the phase difference between the clock signals and the data signals to avoid transmission errors.

BRIEF SUMMARY OF THE INVENTION

Therefore, the present invention provides an electronic device. The electronic device includes an image capture module, a deserializer, and a processor. The image capture module generates a first image signal in a first format. The deserializer is connected to the image capture module to receive the first image signal, and performs a de-serializing operation on the first image signal to convert the first image signal into a second image signal in a second format. The second image signal includes a first clock signal and a first data signal. The processor receives the second image signal and processes the second image signal to generate image data. During a first transmission period in which the deserializer transmits the second image signal to the processor, the processor periodically sends a first trigger signal to the deserializer at a correction period. Whenever the deserializer receives the first trigger signal, the deserializer inserts an initial deskew sequence into the first data signal, and the processor corrects the phase of the first data signal according to the initial deskew sequence and the first clock signal.

The present invention also provides a method for signal phase correction. The method for signal phase correction includes the following steps. A first image signal is generated in a first format by an image capture module. A de-serializing operation is performed by a deserializer to convert the first image signal into a second image signal in a second format. The second image signal includes a clock signal and a data signal. During the transmission period of the second image signal, an initial deskew sequence is periodically inserted into the data signal at a correction period. An initial deskew sequence and a clock signal are used to correct the phase of the data signal.

DETAILED DESCRIPTION OF THE INVENTION

In order to make the above-mentioned objects, features and advantages of the present invention more obvious and easy to understand, a preferred embodiment is described in detail below with reference to the accompanying drawings.

Figure 1:
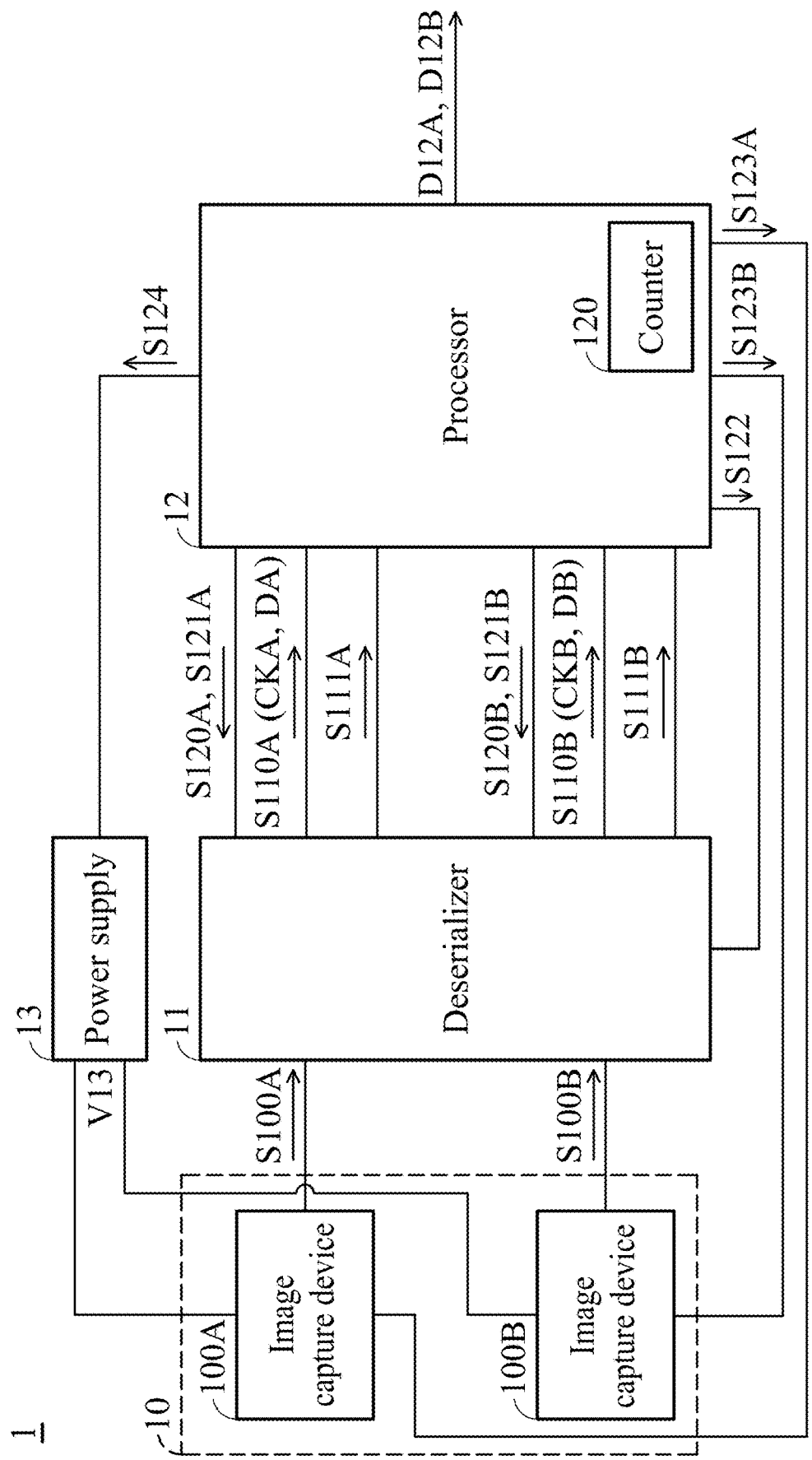
FIG. 1 shows an electronic device according to an embodiment of the present invention.

FIG. 1 shows an electronic device according to an embodiment of the present invention. Referring to FIG. 1, an electronic device 1 includes an image capturing module 10, a deserializer 11, a processor 12, and a power supply 13. In one embodiment, the electronic device 1 is a vehicle electronic device, for example, an electronic device for automatic driving assistance. The image capturing module 10 includes at least one image capture device. In one embodiment, the image capturing module 10 includes up to four image capture devices. In the embodiment of FIG. 1, the image capturing module 10 includes two image capture devices 100A and 100B as an example. The image capture devices 100A and 100B may be cameras, video cameras, monitors, or other devices capable of capturing images.

The power supply 13 generates a supply voltage V13 and provides the supply voltage V13 to the image capture devices 100A and 100B, so that the image capture devices 100A and 100B may perform operations. In one embodiment, the processor 12 generates a control signal S124 to control whether the power supply 13 provides the supply voltage V13 to the image capture devices 100A and 100B.

When the image capture devices 100A and 100B are powered by the supply voltage V13, the image capture devices 100A and 100B capture images respectively to obtain the corresponding capture signals. In one embodiment, each of the image capture devices 100A and 100B includes a serializer. For example, the format of the capture signals obtained by the image capture devices 100A and 100B respectively corresponds to Mobile Industry Processor Interface D-PHY Camera Serial Interface (MIPI D-PHY CSI). That is, the captured signals are transmitted using the MIPI D-PHY CSI protocol. The serializer of the image capture device 100A converts the corresponding capture signal into the image signal S100A, and the serializer of the image capture device 100B converts the corresponding capture signal into the image signal S100B. In this embodiment, the format of the image signals S100A and 100B corresponds to Flat Panel Display Link (FPD-Link) to effectively extend the transmission distance. The image capture devices 100A and 100B transmit the image signals S100A and S100B to the deserializer 11 through their respective FPD-Link interfaces.

The deserializer 11 is connected to the two image capture devices 100A and 100B of the image capturing module 10 to receive the image signals S100A and 100B. The deserializer 11 performs a de-serializing operation on the image signals S100A and 100B respectively. In this embodiment, according to the de-serializing operation, the deserializer 11 converts the image signals S100A and 100B into the image signals S110A and S110B respectively. In this embodiment, the format of the image signals S110A and S110B corresponds to MIPI D-PHY CSI. In other words, the deserializer 11 converts the FPD-Link image signals S100A and S100B into MIPI D-PHY CSI image signals S110A and S110B respectively. The deserializer 11 transmits the image signals S110A and S110B to the processor 12 based on the MIPI D-PHY CSI protocol.

Figure 2A:
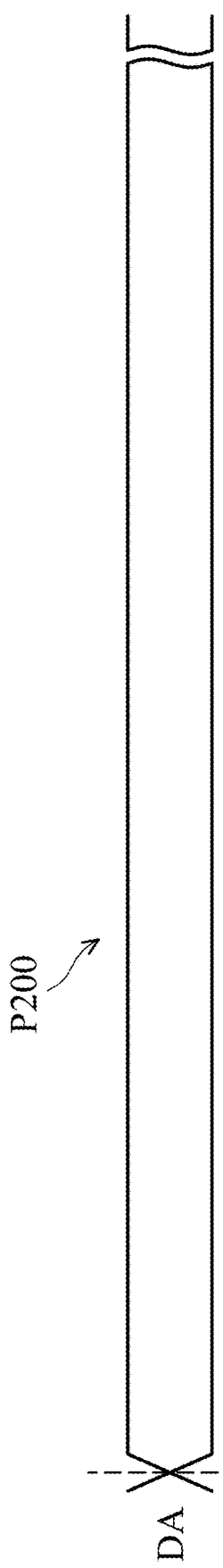
FIG. 2A shows a diagram of a data signal according to an embodiment of the present invention.

Based on the MIPI D-PHY CSI protocol, each of the image signals S110A and S110B includes a clock signal and a data signal. Specifically, the image signal S110A includes a clock signal CKA and a data signal DA, and the image signal S110B includes a clock signal CKB and a data signal DB. For example, FIG. 2A shows the data signal DA in a transmission period P200 when the deserializer 11 transmits the image signal S110A to the processor 12.

The processor 12 receives the image signal S110A and processes the image signal S110A to generate image data D12A to represent the image captured by the image capture device 100A. Similarly, the processor 12 receives the image signal S110B and processes the image signal S110B to generate image data D12B to represent the image captured by the image capture device 100B. In one embodiment, the processor 12 transmits the image data D12A and D12B to the backend device for further processing or other functions. For example, the processor 12 transmits the image data D12A and D12B to a display device to display the images captured by the image capture devices 100A and 100B.

In one embodiment of the present invention, in order to reduce the adverse effects on the image signals S110A and S110B, the electronic device 1 of the present invention can perform phase correction in a periodic deskew (PD) mode, an initial deskew (ID) mode and Dynamic Deskew Technology (DDT) mode to compensate for the above-mentioned phase difference. The adverse effects, for example, may include a phase difference between the clock signals and data signals of each of the image signals S110A and S110B. This is caused by the length of the transmission lines between the deserializer 11 and the processor 12 or the environmental temperature of the deserializer 11 and the processor 12.

The following will take the image capture device 100A and related signals as an example to illustrate the operation of the electronic device 1 of the present invention.

When the electronic device 1 is activated, the processor 12 initializes the deserializer 11, and the processor 12 controls the power supply 13 to provide the supply voltage V13 to the image capture devices 100A and 100B through the control signal S124. In addition, after the above-mentioned initialization, the processor 12 controls the deserializer 11 to perform corresponding operations of the PD mode, ID mode, or DDT mode.

After determining the operation performed by the deserializer 11, the image capture device 100A captures an image and generates the image signal S100A based on the captured image. The image capture device 100A transmits the image signal S100A to the deserializer 11. Once the deserializer 11 receives the image signal S100A, the deserializer 11 performs a de-serializing operation on the image signal S100A to generate the image signal S110A. When the deserializer 11 generates the image signal S110A, the electronic device 1 enters the transmission period P200 to transmit the image signal S110A to the processor 12.

When the electronic device 1 is in the PD mode, the processor 12 controls the deserializer 11 to start the PD operation through a mode control signal S121A. When the deserializer 11 performs the PD operation in the PD mode, during the transmission period P200, the deserializer 11 periodically inserts a PD sequence into the data signal DA of the image signal S110A at a fixed period. The processor 12 corrects the phase of the data signal DA according to the received clock signal CKA and the data signal DA including a plurality of PD sequences. Therefore, in the PD mode, the electronic device 1 periodically performs multiple phase corrections.

When the electronic device 1 is in the ID mode, the processor 12 controls the deserializer 11 to start the ID operation through the mode control signal S121A. When the deserializer 11 performs the ID operation in the ID mode, the deserializer 11 inserts an ID sequence into the data signal DA of the image signal S110A at the initial time of the transmission period P200. Then, the processor 12 corrects the phase of the data signal DA according to the received clock signal CKA and the data signal DA including one ID sequence. Therefore, in the ID mode, one phase correction is performed.

In each of the PD mode and the ID mode, the processor 12 generates image data D12A according to the clock signal CKA and the phase-corrected data signal DA. The PD operation in the PD mode and the ID operation in the ID mode of the deserializer 11, as well as the composition of the PD sequence and the ID sequence, are all known to person with ordinary skills in the technical field to which the present invention belongs. Description is omitted here.

Figure 2B:
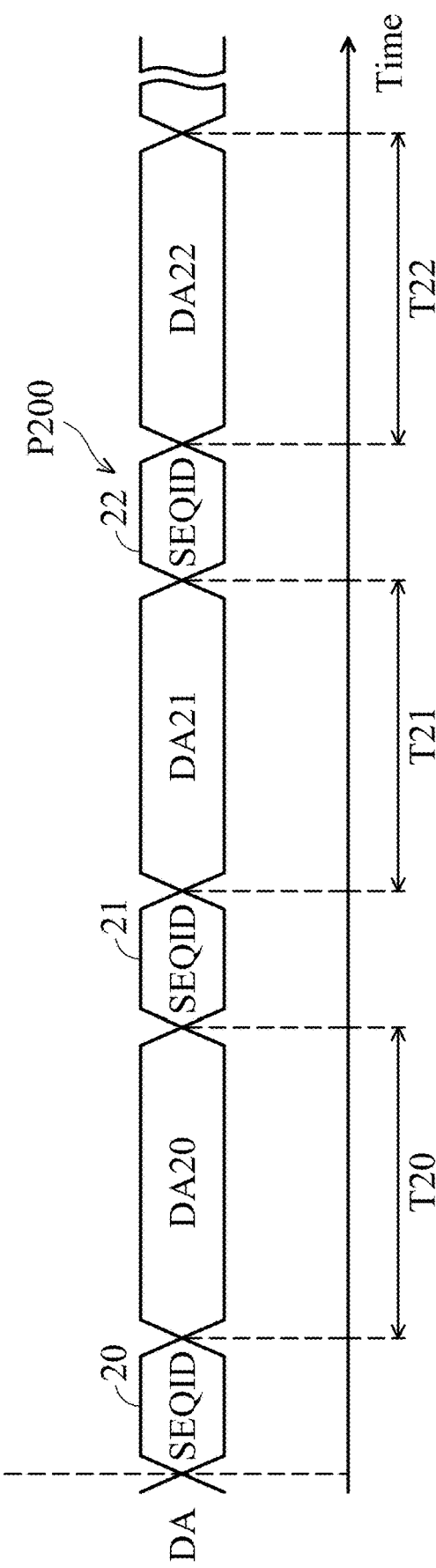
FIG. 2B shows a diagram of a data signal and a deskew sequence in a Dynamic Deskew Technology (DDT) mode according to an embodiment of the present invention.

When the electronic device 1 is in the DDT mode, the processor 12 controls the deserializer 11 to start the ID operation through the mode control signal S121A. The deserializer 11 inserts an ID sequence, such as the ID sequence SEQID (20) in FIG. 2B, into the data signal DA of the image signal S110A at the initial time of the transmission period P200. Afterwards, during the transmission period P200, the processor 12 periodically sends a trigger signal S120A to the deserializer 11 in a variable correction period. When the deserializer 11 performs an ID operation in the DDT mode, each time the deserializer 11 receives the trigger signal S120A, the deserializer 11 inserts an ID sequence into the data signal DA. Referring to FIG. 2B, based on the trigger signal S120A periodically sent in a correction period, the deserializer 11 periodically inserts multiple ID sequences SEQID, such as the ID sequence SEQID (21~22) in FIG. 2B, into the data signal DA. FIG. 2B only shows three ID sequences SEQID (20~22) as an example. Therefore, according to the insertion of multiple ID sequences SEQID (20~22), the data signal DA is divided into multiple data sections, for example, data sections DA20~DA22. The time T20~T22 occupied by the data sections DA20~DA22 respectively is equal to the correction period. An ID sequence SEQID and the following data driver form a frame. For example, the ID sequence SEQID (20) and the following data section DA20 form a frame, the ID sequence SEQID (21) and the following data section DA21 form a frame data, and the ID sequence SEQID (22) and the subsequent data section DA22 form a frame. The processor 12 corrects the phase of the data signal DA according to the received clock signal CKA and the data signal DA including a plurality of ID sequences. Therefore, in the DDT mode, the electronic device 1 periodically performs multiple phase corrections.

In embodiments of the present invention, the correction period used when performing the PD operation in the PD mode is fixed, and the correction period used when performing the ID operation in the DDT mode is variable. The correction period is determined by the processor 12. For example, when the electronic device 1 is activated, the processor 12 initially sets the correction period to a larger value (e.g., 15 milliseconds (ms)). As the operating time of the electronic device 1 increases or the transmission time between the deserializer 11 and the processor 12 increases, the environmental temperature increases. At this time, the processor 12 changes the correction period to be smaller (for example, 5 ms). In this way, in the DDT mode of the present invention, the correction period can be adjusted dynamically, thereby enabling real-time phase correction.

Referring to FIG. 1, the processor 12 includes a counter 120 for counting time. During the transmission period P200, the processor 12 sends the trigger signal S120A to the deserializer 11 every time the counter 120 starts counting from 0 to the correction period. Then, the counter 120 is reset and starts counting from 0 again.

Figure 3:
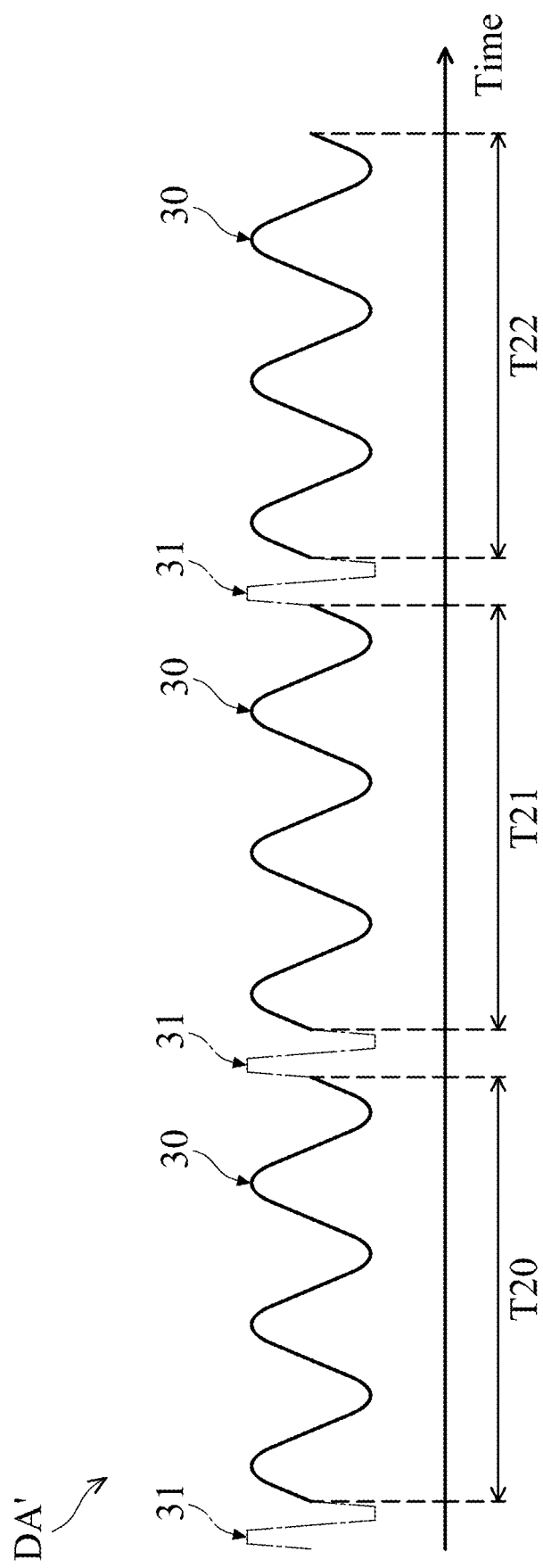
FIG. 3 shows a diagram of the phase correction of a data signal in the DDT mode according to an embodiment of the present invention.

In one embodiment of the present invention, in the DDT mode, the processor 12 inserts a compensation section into the data signal DA to compensate for the phase difference, thereby achieving phase correction. Referring to FIG. 3, it shows the phase-corrected data signal DA' in DDT mode. Symbol 30 represents the original data signal DA. Symbol 31 represents the inserted compensation section, which corresponds to the ID sequence SEQID inserted into the data signal DA by the deserializer 11 (shown in FIG. 2B). By adding the compensation section 31, the phase difference between the clock signal CKA and the data signal DA' is reduced or eliminated.

In one embodiment, the processor 12 uses an Inter-Integrated Circuit (I2C) bus transmission mode to control each of the signal S121A and the trigger signal S120A.

In one embodiment, after the deserializer 11 receives the image signal S100A and the deserializer 11 performs a de-serializing operation on the image signal S100A, the deserializer 11 determines whether the de-serializing operation is completed. When the deserializer 11 determines that the de-serializing operation is completed to generate the image signal S110A, the electronic device 1 enters a transmission period to transmit the image signal S110A from the deserializer 11 to the processor 12.

When the deserializer 11 determines that the de-serializing operation is not completed, the deserializer 11 transmits a status check result signal S111A to the processor 12, and, at the same time, refreshes the status check value stored in the register in the deserializer 11. According to the status check result signal S111A, the processor 12 debugs the deserializer 11, or resets the deserializer 11 or the image capture device 100A. In one embodiment, when the connection between the image capture device 100A and the deserializer 11 is interrupted, the deserializer 11 determines that the de-serializing operation is not completed. In another embodiment, when the image signal S100A is incomplete (for example, at least one packet is missing in the image signal S100A), the deserializer 11 determines that the de-serializing operation is not completed. In another embodiment, when the deserializer 11 fails to perform the de-serializing operation, the deserializer 11 determines that the de-serializing operation is not completed.

According to an embodiment of the present invention, when the deserializer 11 determines that the de-serializing operation is not completed, according to the status check result signal S111A, the processor 12 controls the power supply 13 to stop supplying the voltage V13 through the control signal S124. Then, the processor 12 controls the power supply 13 to provide the supply voltage V13 to the image capture device 100A again, thereby resetting the image capture device 100A (hard reset).

According to another embodiment of the present invention, when the deserializer 11 determines that the de-serializing operation is not completed, the processor 12 resets the image capture device 100A through the reset signal S123A (soft reset).

According to an embodiment of the present invention, when the deserializer 11 determines that the de-serializing operation is not completed, the processor 12 resets the image deserializer 11 through the reset signal S122.

According to an embodiment of the present invention, when the deserializer 11 determines that the de-serializing operation is not completed, the processor 12 stops receiving the image signal S110A from the deserializer 11 according to the status check result signal S111A.

According to an embodiment of the present invention, the deserializer 11 transmits the status check result signal S111A to the processor 12 through a General-Purpose Input/Output (GPIO) pin.

According to the above embodiments, in addition to the PD mode and the ID mode, the electronic device 1 can also perform phase correction in the DDT mode. In the DDT mode, the electronic device 1 periodically performs multiple phase corrections and dynamically adjusts the correction period according to the state of the environment (e.g., environmental temperature). In addition, the status check result signal of the present invention is used to instantly report the status of the deserializer 11 (i.e., whether the de-serializing operation of the deserializer 11 is completed) to the processor 12. Based on the operation in DDT mode and the feedback mechanism of the status of the deserializer 11, the stability of image signal transmission can be effectively improved.

The operations of the image capture device 100B and the operations based on the image capture device 100B is similar to the description using the image capture device 100A as an example. For example, the above-mentioned operations can be used to generate a status check result signal S111B, a trigger signal S120B, a mode control signal S121B, reset signals S122 and S123B, and the control signal S124 that are related to the image capture device 100B. Thus, the description is omitted here.

Figure 4:
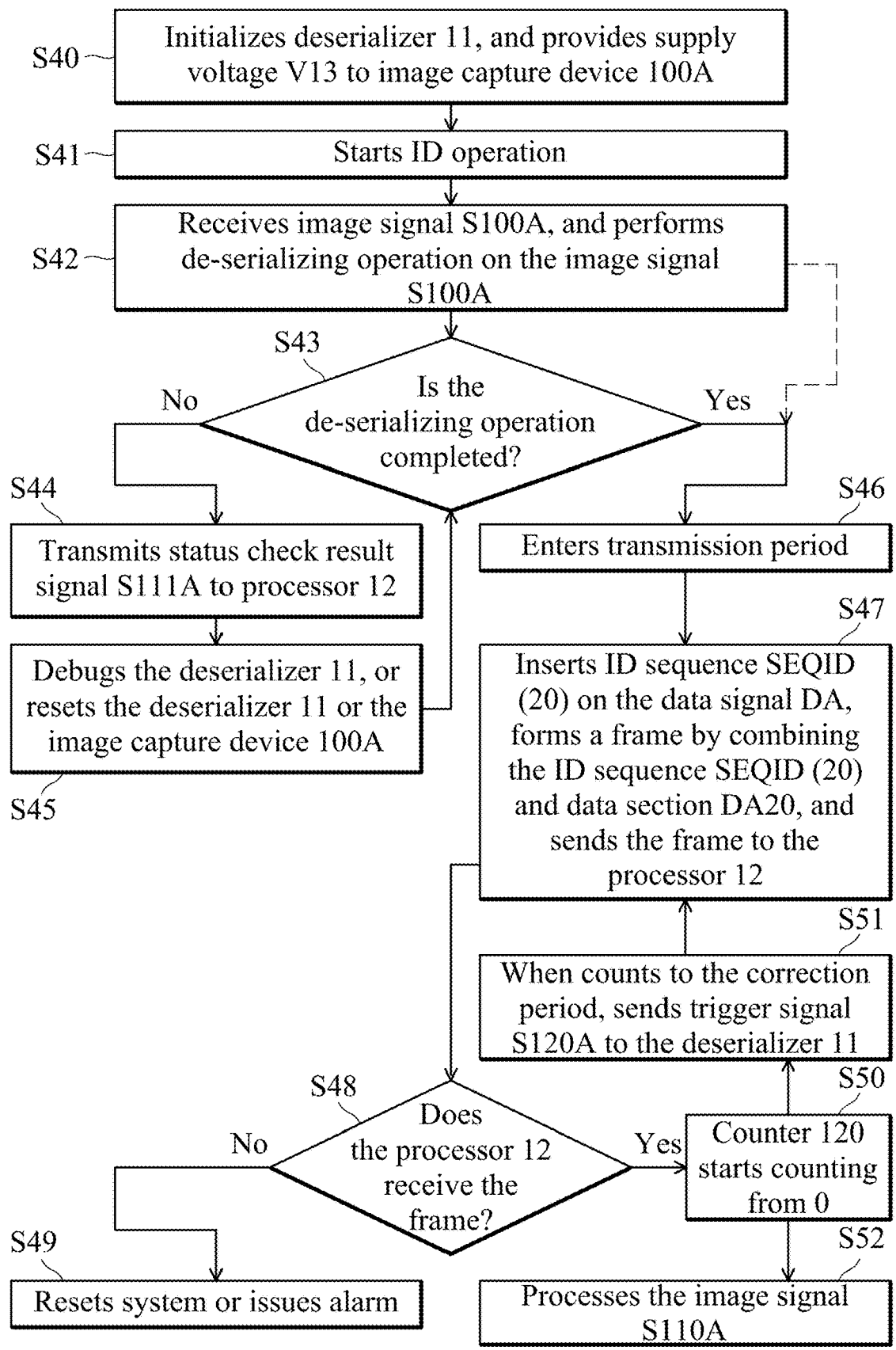
FIG. 4 shows a flow chart of a method for signal phase correction according to an embodiment of the present invention.

FIG. 4 shows a flow chart of a method for signal phase correction according to an embodiment of the present invention. Referring to FIGS. 1, 2B, and 4, the image capture device 100A will be used to illustrate the method for signal phase correction of the present invention, especially the method for signal phase correction in the DDT mode. When the electronic device 1 is activated, the processor 12 initializes the deserializer 11, and the processor 12 controls the power supply 13 to provide the supply voltage V13 to the image capture device 100A through the control signal S124 (step S40). When the image capture device 100A is powered by the supply voltage V13, the image capture device 100A captures an image to generate the image signal S100A. Next, the processor 12 controls the deserializer 11 through the mode control signal S121A to start the ID operation (step S41). After activating the ID operation of the deserializer 11, the deserializer 11 receives the image signal S100A and performs a de-serializing operation on the image signal S100A (step S42). The deserializer 11 determines whether the de-serializing operation is completed (step S43).

When the deserializer 11 determines that the de-serializing operation is not completed (step S43—No), the deserializer 11 transmits the status check result signal S111A to the processor 12 (step S44). In addition, the status check value stored in the register of the deserializer 11 is refreshed at the same time. Next, according to the status check result signal S111A, the processor 12 debugs the deserializer 11, or resets the deserializer 11 or the image capture device 100A (step S45). After step S45, the method for signal phase correction returns to step S43, and the deserializer 11 determines whether the de-serializing operation performed after the above-mentioned debugging or reset operation is completed.

When the deserializer 11 determines that the de-serializing operation is completed (step S43—Yes), the deserializer 11 generates the image signal S110A, and the electronic device 1 enters the transmission period P200 to transmit the image signal S110A to the processor 12 (step S46). At the initial time of the transmission period P200, the deserializer 11 performs the ID operation to insert the ID sequence SEQID (20) on the data signal DA, forms a frame by combining the ID sequence SEQID (20) and the data section DA20, and sends the frame to the processor 12 (step S47). Next, the processor 12 determines whether the frame from the deserializer 11 is indeed received (step S48).

When the processor 12 does not receive the frame from the deserializer 11 (step S48—No), resets the system of the electronic device 1 or triggers the electronic device to issue an alarm (step S49).

When the processor 12 does receive the frame from the deserializer 11 (step S48—Yes), the counter 120 of the processor 12 starts counting from 0 (step S50). When the counter 120 counts to the correction period, the processor 12 sends the trigger signal S120A to the deserializer 11 (step S51). After step S51, the method for signal phase correction returns to step S47. The deserializer 11 performs the ID operation again to insert an ID sequence SEQID (21) into the data signal DA, forms a frame by combining the ID sequence SEQID (21) and the data section DA20, and sends the frame to the processor 12 (step S47).

After step S50, the processor 12 further processes the image signal S110A to generate image data D12A to represent the image captured by the image capture device 100A (step S52). The processor 12 can transmit the image data D12A to the backend device for further processing or other functions.

According to the above description, through steps S47~S48 and S50~S51, the deserializer 11 periodically inserts multiple ID sequences SEQID into the data signal DA to achieve phase correction in the DDT mode.

In other embodiments, the method for signal phase correction may not perform steps S43~S45. Therefore, as indicated by the dotted line between steps S42 and S46 in FIG. 4, after the deserializer 11 receives the image signal S100A and performs a de-serializing operation on the image signal S100A (step S42), the deserializer 11 generates the image signal S110A, and the electronic device 1 directly enters the transmission period (step S46).

Although the present invention is disclosed above in terms of preferred embodiments, it is not intended to limit the present invention. Anyone skilled in the art can make changes and modifications without departing from the spirit and scope of the present invention. Therefore, the protection scope of the present invention should be determined by the scope of the following claims.

What is claimed is:

1. An electronic device, comprising:
   an image capturing module, configured to generate a first image signal in a first format;
   a deserializer, connected to the image capturing module to receive the first image signal, wherein the deserializer is configured to perform a de-serializing operation on the first image signal to convert the first image signal into a second image signal in a second format, wherein the second image signal includes a first clock signal and a first data signal; and
   a processor, configured to receive the second image signal, wherein the processor is configured to process the second image signal to generate image data,
   wherein during a first transmission period in which the deserializer transmits the second image signal to the processor, the processor sends a first trigger signal to the deserializer periodically in a correction period; and
   wherein whenever the deserializer receives the first trigger signal, the deserializer inserts an initial deskew sequence into the first data signal, and the processor corrects a phase of the first data signal according to the initial deskew sequence and the first clock signal.

2. The electronic device as claimed in claim 1, wherein the first format corresponds to Flat Panel Display Link (FPD-Link).

3. The electronic device as claimed in claim 1, wherein the second format corresponds to Mobile Industry Processor Interface D-PHY Camera Serial Interface (MIPI D-PHY CSI).

4. The electronic device as claimed in claim 1, wherein:
   the deserializer determines whether the de-serializing operation is completed;
   when the deserializer determines that the de-serializing operation is completed, the electronic device enters the first transmission period to transmit the second image signal from the deserializer to the processor; and
   when the deserializer determines that the de-serializing operation is not completed, the deserializer transmits a status check result signal to the processor, and according to the status check result signal, the processor debugs the deserializer, or resets the deserializer or the image capturing module.

5. The electronic device as claimed in claim 4, wherein when the connection between the image capturing module and the deserializer is interrupted, when the first image signal is incomplete, or when the deserializer fails to perform the de-serializing operation, the deserializer determines that the de-serializing operation is not completed.

6. The electronic device as claimed in claim 4, wherein the deserializer transmits the status check result signal to the processor through a General-Purpose Input/Output (GPIO) pin.

7. The electronic device as claimed in claim 1, wherein the processor transmits the first trigger signal using an Inter-Integrated Circuit (I2C) bus.

8. The electronic device as claimed in claim 1, wherein:
   the image capturing module includes a first image capture device; and
   the first image capture device generates the first image signal, and the processor sends the first trigger signal to the deserializer during the first transmission period.

9. The electronic device as claimed in claim 8, wherein:
   the image capturing module further includes a second image capture device;
   the second image capture device generates a third image signal in the first format;
   the deserializer connects to the second image capture device to receive the third image signal, and performs a de-serializing operation on the third image signal to convert the third image signal into a fourth image signal in the second format, wherein the fourth image signal includes a second clock signal and a second data signal;

the processor receives the fourth image signal, and processes the fourth image signal to generate at least one corresponding image;

during a second transmission period in which the deserializer transmits the fourth image signal to the processor, the processor sends a second trigger signal to the deserializer in the correction period; and whenever the deserializer receives the second trigger signal, the deserializer inserts the initial deskew sequence into the second data signal, and the processor corrects the phase of the second data signal according to the initial deskew sequence and the second clock signal.

10. The electronic device as claimed in claim 1, wherein the processor includes:

a counter, configured to count time, wherein during the first transmission period, every time the counter counts to the correction period, the processor sends the first trigger signal to the deserializer.

\* \* \* \* \*